US008427988B2

(12) United States Patent
Pelletier et al.

(10) Patent No.: US 8,427,988 B2
(45) Date of Patent: Apr. 23, 2013

(54) METHOD AND APPARATUS TO REDUCE RADIO RESOURCE OVERHEAD ASSOCIATED WITH INTERMITTENT TRAFFIC

(75) Inventors: Benoit Pelletier, Roxboro (CA); Eldad M. Zeira, Huntington, NY (US); Christopher R. Cave, Verdun (CA); Paul Marinier, Brossard (CA); Vincent Roy, Montreal (CA); In H. Kim, Norristown, PA (US)

(73) Assignee: Interdigital Technology Corporation, Wilmington, DE (US)

( * ) Notice: Subject to any disclaimer, the term of this patent is extended or adjusted under 35 U.S.C. 154(b) by 1053 days.

(21) Appl. No.: 12/191,105

(22) Filed: Aug. 13, 2008

(65) Prior Publication Data
US 2009/0046667 A1    Feb. 19, 2009

Related U.S. Application Data

(60) Provisional application No. 60/955,579, filed on Aug. 13, 2007.

(51) Int. Cl.
*G08C 17/00* (2006.01)
(52) U.S. Cl.
USPC ........ 370/311; 370/310.2; 370/318; 370/328; 455/13.4; 455/127.1; 455/343.1; 455/422.1; 455/522; 455/574; 713/320
(58) Field of Classification Search ............... 370/310.2, 370/311, 318, 328–339, 349; 455/13.4, 127.1, 455/127.5, 343.1, 343.2, 343.3, 343.4, 422.1, 455/522, 574; 713/300, 310, 320–324, 330, 713/340
See application file for complete search history.

(56) References Cited

U.S. PATENT DOCUMENTS

| 6,370,392 | B1 * | 4/2002 | Li et al. ........................ 455/522 |
| 6,587,672 | B1 * | 7/2003 | Chuah et al. .................... 455/69 |
| 6,643,272 | B1 | 11/2003 | Moon et al. |
| 6,804,219 | B2 | 10/2004 | Koo et al. |
| 6,876,866 | B1 | 4/2005 | Ulupinar et al. |
| 7,006,482 | B1 * | 2/2006 | Choi et al. .................... 370/342 |
| 7,058,408 | B2 * | 6/2006 | Morgan et al. ................ 455/450 |
| 2002/0064140 | A1 * | 5/2002 | Numminen .................... 370/311 |

(Continued)

FOREIGN PATENT DOCUMENTS

| EP | 1 349 295 | 10/2003 |
| WO | 2005/079095 | 8/2005 |

OTHER PUBLICATIONS

3GPP TS 25.214 v7.5.0, May 2007, 3rd Generation Partnership Project—Technical Specification Group Radio Access Network—Physical Layer Procedures, Release 7, 3GPP.*

(Continued)

*Primary Examiner* — Hoon J Chung
(74) *Attorney, Agent, or Firm* — Volpe and Koenig, P.C.

(57) ABSTRACT

A method and apparatus for No-TX mode for a wireless transmit/receive unit (WTRU) and Node B that suspends the transmission of power control updates and associated signaling over dedicated uplink and downlink channels. Triggers and signals between the WTRU and Node B to activate and disable No-TX mode. A radio link is re-established to resume data transmission when No-TX mode is disabled, and data may also be transmitted during defined transmission opportunities while in No-TX mode.

10 Claims, 2 Drawing Sheets

U.S. PATENT DOCUMENTS

| | | | | |
|---|---|---|---|---|
| 2003/0081584 A1* | 5/2003 | Heo | | 370/342 |
| 2005/0047530 A1* | 3/2005 | Lee et al. | | 375/343 |
| 2006/0171342 A1* | 8/2006 | Dateki | | 370/311 |
| 2008/0200203 A1* | 8/2008 | Malladi et al. | | 455/522 |

OTHER PUBLICATIONS

3GPP TS 25.213 v7.2.0, May 2007, 3rd Generation Partnership Project—Technical Specification Group Radio Access Network—Spreading and Modulation, Release 7, 3GPP.*

3GPP TS 25.331 v7.5.0 (Jun. 2007), 3GPP.*

3GPP TS 25.319 v7.2.0 (Mar. 2007)—3GPP Technical Specification Group Radio Access Network, Enhanced uplink, Overal description, Stage 2 (Release 7), 3GPP.*

Third Generation Partnership Project, "Radio Resource Control (RRC); Protocol Specification (Release 8)", 3GPP TS 25.331, V8.3.1, (Aug. 2008).

Third Generation Partnership Project, "Radio Resource Control (RRC); Protocol Specification (Release 7)", 3GPP TS 25.331, V7.5.0, (Jun. 2007).

Third Generation Partnership Project, "Radio Resource Control (RRC); Protocol Specification (Release 7)", 3GPP TS 25.331, V7.9.1, (Aug. 2008).

Third Generation Partnership Project, "Radio Resource Control (RRC); Protocol Specification (Release 8)", 3GPP TS 25.331,V8.3.1, (Aug. 2008).

Third Generation Partnership Project, "Enhanced uplink; Overall description; Stage 2 (Release 8)", 3GPP TS 25.319, V8.1.0, (Mar. 2008).

Third Generation Partnership Project, "Enhanced uplink; Overall description; Stage 2 (Release 8)", 3GPP TS 25.319, V8.2.0, (May 2008).

Third Generation Partnership Project, "Physical layer procedures (FDD) (Release 8)", 3GPP TS 25.214, V8.1.0, (Mar. 2008).

Third Generation Partnership Project, "Physical layer procedures (FDD) (Release 8)", 3GPP TS 25.214, V8.2.0, (May 2008).

Third Generation Partnership Project, " Technical Specification Group Radio Access Network; Enhanced uplink; Overall description; Stage 2 (Release 7)," 3GPP TS 25.319 V7.2.0 (Mar. 2003).

Third Generation Partnership Project, "Enhanced uplink; Overall description; Stage 2 (Release 8)," 3GPP TS 25.319 V8.1.0 (Mar. 2008).

Third Generation Partnership Project, "Enhanced uplink; Overall description; Stage 2 (Release 8)," 3GPP TS 25.319 V8.2.0 (May 2008).

Third Generation Partnership Project, "Physical layer procedures (FDD) (Release 8)," 3GPP TS 25.214 V8.1.0 (Mar. 2008).

Third Generation Partnership Project, "Physical layer procedures (FDD) (Release 8)," 3GPP TS 25.214 V8.2.0 (May 2008).

Third Generation Partnership Project, "Radio Resource Control (RRC); Protocol Specification (Release 7)," 3GPP TS 25.331 V7.5.0 (Jun. 2007).

Third Generation Partnership Project, "Radio Resource Control (RRC); Protocol Specification (Release 7)," 3GPP TS 25.331 V7.9.1 (Aug. 2008).

Third Generation Partnership Project, "Radio Resource Control (RRC); Protocol Specification (Release 8)," 3GPP TS 25.331 V8.3.1 (Aug. 2008).

Third Generation Partnership Project, "Technical Specification Group Radio Access Network; Spreading and modulation (FDD) (Release 7)," 3GPP TS 25.213 V7.2.0 (May 2007).

Third Generation Partnership Project, "Technical Specification Group Radio Access Network; Physical layer procedures (FDD) (Release 7)," 3GPP TS 25.214 V7.5.0 (May 2007).

* cited by examiner

METHOD AND APPARATUS TO REDUCE RADIO RESOURCE OVERHEAD ASSOCIATED WITH INTERMITTENT TRAFFIC

CROSS REFERENCE TO RELATED APPLICATION(S)

This application claims the benefit of U.S. provisional application No. 60/955,579, filed Aug. 13, 2007, which is incorporated by reference as if fully set forth.

FIELD OF INVENTION

This application is related to wireless communications.

BACKGROUND

Power control is essential in mobile wideband code division multiple access (WCDMA) communications systems to mitigate the near-far problem and to keep the rise over thermal (RoT) noise below an acceptable level. The near-far problem occurs when multiple transmitters transmit from different distances to a receiver, such that signals received from nearby transmitters cause greater interference and reduces the signal-to-noise ratio (SNR) of signals received from more distant transmitters. For example, this problem may arise when multiple wireless transmit/receive units (WTRUs) are communicating with a base station, or equivalently a Node B, in a wireless communications system.

Wireless communications systems based on code division multiple access (CDMA) technology, and in particular Third Generation Partnership Project (3GPP) WCDMA frequency division duplex (FDD) systems, therefore rely on a closed-loop power control mechanism to improve system performance. In typical WCDMA systems, uplink (UL) power is adjusted using regularly transmitted Transmission Power Control (TPC) commands from a Node B carried on the downlink dedicated physical channel (DPCH), or the fractional DPCH (F-DPCH), to a wireless transmit/receive unit (WTRU). The downlink (DL) power is adjusted using TPC commands from the WTRU carried on the uplink dedicated physical control channel (DPCCH) to the Node B. The uplink DPCCH also carries pilot bits in order to perform channel estimation at the receiver, such that the pilot bits enable accurate demodulation of the received signal. FIG. 1 shows a conventional usage of power-control loop channels in a WCDMA communications system. The WTRU and the Node B are each equipped with at least a processor, a transmitter and a receiver for use in transmitting and receiving communication signals over an established radio link including the F-DPCH or DPCH and the DPCCH. The processor operates according to a layered communications protocol, and generally includes a medium access control (MAC) layer component (layer 2), a physical (PHY) layer component (layer 1) and higher layer components (layer 3 and above) including, but not limited to, a radio resource control (RRC) layer component and a radio link control (RLC) layer component.

Transmission of the DPCCH on the uplink represents a significant power overhead, which not only reduces the battery power at the WTRU but also creates additional noise rise at the Node B. In addition, the transmission of the F-DPCH or DPCH on the downlink also contributes to power overhead and, even more importantly, consumes scarce CDMA code resource. In general, maintaining the power control loop is relatively costly and should be limited to when necessary, that is, when the WTRU transmits or receives data.

The 3GPP WCDMA FDD standards specify a number of modes and states of operations for a mobile WTRU to allow efficient use of power and radio resources. The amount of resource and power used by a WTRU depends on its current mode and state. In general, a WTRU in IDLE mode carries out cell search and uses very little power. Once in connected mode, a WTRU can be in one of four states: CELL_PCH state, URA_PCH state, CELL_FACH state and CELL_DCH state. In CELL_PCH state and URA_PCH state, the WTRU monitors the network for paging messages and communicates mobility messages to the network, and accordingly uses very small amounts of power and network resources. In CELL_FACH state, the WTRU continuously monitors the network for possible dedicated messages and therefore requires more power and network resources. A WTRU in CELL_FACH state can initiate data transmission on the random access channel (RACH), however, the RACH is only suitable for small amounts of data. In CELL_DCH state, all dedicated resources are allocated to the WTRU and the power control loop is maintained continuously. This is the most power-intensive state and it is designed for continuous transmission from and to the network and for carrying larger amounts of data. Details on the relationships between the different states are described in 3GPP Technical Standard (TS) 25.331 V7.5.0, which is incorporated herein.

In 3GPP high speed downlink packet access (HSDPA) Release 7, a number of features were introduced to reduce power control overhead associated with the transmission of voice over internet protocol (VoIP) and other sporadic traffic. In particular, the Discontinuous Transmission (DTX) and Discontinuous Reception (DRX) modes of operation were provided to allow the WTRU and Node B to reduce the frequency of power control and channel quality information (CQI) reporting, thereby increasing the number of users that can be supported in a cell. While these modes of operation are efficient for VoIP and similar types of traffic, DTX and DRX do not provide sufficient power-saving capabilities for traffic characterized by long periods of inactivity followed by short-length messages or bursty traffic. Examples of this type of traffice include virtual private network (VPN) keep-alive messages, uniform resource locator (URL) requests, internet browsing, file downloads and email. In these cases, during a long period of inactivity (also called a reading time), the power control loop, that is DPCCH and F-DPCH/DPCH, is still maintained even if no data is transmitted.

For these types of data traffic, it becomes inefficient to maintain the resource-consuming power control loop in CELL_DCH state. The power control overhead directly limits the number of users that can be serviced and translates into additional noise rise on the UL and additional interference levels on the DL. It also leads to inefficient use of the scarce battery resources of the WTRU. One option using the current technology of 3GPP HSDPA Release 7 is to move a WTRU from CELL_FACH state (or CELL_PCH state, Universal Terrestrial Radio Access Network Registration Area Paging Channel (URA_PCH)) to CELL_DCH state every time a new message needs to be transmitted, and the WTRU subsequently returns to CELL_FACH state (or CELL_PCH state, URA_PCH) state. However, this procedure would result in large signaling and resource overhead. In addition, maintaining the WTRU in CELL_FACH state would not be appropriate as the legacy RACH is not designed to transmit large amounts of data.

Additionally, an important resource in the HSDPA network is the Node B DL code space. The DPCH enhancements in 3GPP HSDPA Release 6 and Release 7 reduce the downlink power overhead associated with the Node B DL code space but fail to reduce the code overhead as the F-DPCH code resources are also assigned to DRX receiving WTRUs. As a result, the F-DPCH code resources cannot be used by other WTRUs.

Therefore, it is desirable to increase efficiency of the radio link by removing dependence on the DPCCH continuous transmission between WTRUs and Node Bs. Techniques for efficient use of scarce battery resources by reducing radio overhead in long periods of inactivity, reducing interference caused by control channels and increasing code availability on the DL, are also desirable.

SUMMARY

A method and apparatus to reduce radio resource overhead associated with intermittent traffic are disclosed. In particular, a No-TX mode of operation is defined where TPC commands are suspended on the dedicated channel. Triggers and signaling allow wireless transmit/receive units (WTRUs) and Node Bs to stop the transmission of power control updates and associated signaling over the uplink dedicated physical control channel (DPCCH) and the downlink dedicated physical channel (DPCH) or fractional DPCH (F-DPCH) while remaining in a CELL_FACH state, or alternatively CELL_DCH state. As a result, system capacity and WTRU battery life are increased while allowing the transmission of power control updates and associated signaling to be resumed faster than if the WTRU would have entered CELL_DCH state. WTRUs maintain part of their configuration in No-TX mode such that resuming transmissions do not require a state change. Therefore, there is a reduction in latency and signaling overhead. In one embodiment, a set of downlink and uplink transmission opportunities are defined by the network for communication when No-TX mode is activated. In another embodiment, a set of resource persistence options are defined to describe the level by which radio resources and configuration parameters are released or maintained by the WTRU while in No-TX mode. In another embodiment, a set of triggers and methods are provided by which No-TX mode can be activated. In another embodiment, a set of triggers and methods are provided by which the No-TX mode of operation can be deactivated and dedicated channel transmissions can resume for data transmissions. In another embodiment, a set of methods by which a WTRU can resume communication with the Node B while being in No-TX mode are provided. In another embodiment, a technique for radio link re-establishment following the deactivation of No-TX mode is provided in order for typical CELL_FACH or CELL_DCH radio transmission operations to resume. In another embodiment, a method for a WTRU in No-TX mode to obtain radio resources or configuration without any explicit signaling from the Node B is provided. In another embodiment, temporary allocation of radio resources for those users in No-TX mode is provided. In another embodiment, techniques for providing fast partial link reconfiguration messages to the WTRU are provided.

BRIEF DESCRIPTION OF THE DRAWINGS

A more detailed understanding may be had from the following description, given by way of example in conjunction with the accompanying drawings wherein.

DETAILED DESCRIPTION

Figure 1:
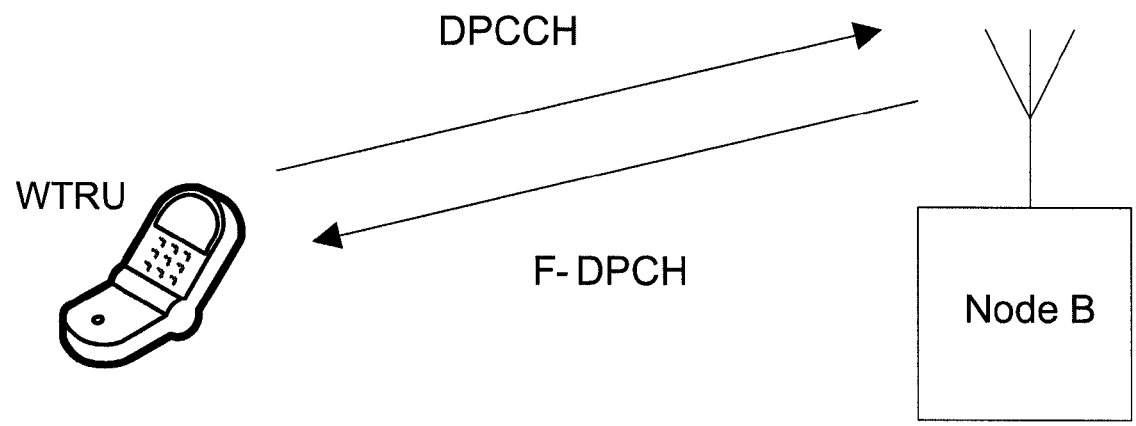
FIG. 1 shows a conventional usage of power-control loop channels in a wideband code division multiple access (WCDMA) communications system.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

A new mode of operation is provided during which Transmission Power Control (TPC) commands are suspended. This new mode of operation is referred to herein as No-TX ("no transmit") mode for convenience; however, other names may be used as desired. More generally, No-TX mode may be interpreted as a new form of CELL_FACH state in the sense that no dedicated physical channel (DPCH) or fractional DPCH (F-DPCH) resources are assigned but provides reduced time to resume full transmission of data when needed. No-TX mode and the methods and embodiments provided herein may be applied to any wireless communications system incurring power control overhead and employing power control loops. The teachings herein are primarily described for wideband code division multiple access (WCDMA) communications systems with respect to a WTRU in CELL_FACH state for illustrative purposes, however, they may also be applied to, for example, WTRUs in CELL_DCH state.

Downlink and Uplink Transmission Opportunities

According to a first embodiment, a set of downlink (DL) and uplink (UL) transmission opportunities are defined by the network for communicating when No-TX mode is activated. When No-TX mode is activated, the DL F-DPCH or DPCH and UL dedicated physical control channel (DPCCH) are no longer transmitted. In order to resume the transmission of the DL F-DPCH or DPCH and UL DPCCH, the network provides transmission opportunities to both the Node B and the WTRU. These transmission opportunities take the form of a listening period at the receiving end, which is the WTRU on the DL and the Node B on the uplink, respectively. For example, during network (Node B) transmission opportunities (or equivalently WTRU listening periods), the WTRU listens for possible network transmissions. During WTRU transmission opportunities (or equivalently network listening periods), the network (Node B) listens for possible WTRU transmissions.

The transmission opportunities (or equivalently the listening periods) may be signaled by higher layers or may be pre-configured. The transmission opportunities may also take the form of known cyclic patterns. Optionally, uplink and downlink transmission opportunity cyclic patterns may be defined independently for additional flexibility. Alternatively, the listening periods can be defined using the existing continuous packet connectivity (CPC) definitions but with longer cycles.

In No-TX mode, as the listening periods become long, it is possible for the network to configure transmission opportunities so that there is minimum overlap between different WTRUs in the No-TX mode. This provides an opportunity for the network to multiplex resources including, for example, high-speed shared control channel (HS-SCCH) codes, enhanced dedicated channel (E-DCH) hybrid automatic repeat request (HARQ) acknowledgement (ACK) indicator channel (E-HICH) codes or others. According to an alternate embodiment, the network may not provide WTRU transmission opportunities and instead use polling during network transmission opportunities.

Resource Persistence Options

According to another embodiment, a set of resource persistence options are provided describing the level by which radio resources and configuration parameters are released or maintained by the WTRU while in the No-TX mode. In a conventional communication system, the Node B may allocate various resources to WTRUs entering CELL_FACH state. In particular, the Node B may allocate a radio network temporary identifier (RNTI), uplink scrambling code, at least one frame offset, downlink channel codes, and signatures for the various control and data channels to each WTRU in CELL_FACH. Some of these resources, such as the number of downlink channelization codes and signatures, are limited.

When WTRUs enter No-TX modes, some of these resources may be released at the system level so that the resources may be used by other WTRUs. At least one of several resource persistence options may be configured for No-TX mode. The following resource persistence options may be used: full persistence; DL E-DCH control channel release; and DL control channels release. In full persistence, a WTRU in No-TX mode keeps all the allocated resources and maintains its configuration. In DL E-DCH control channels release, a WTRU in No-TX mode releases all of the downlink control channel related to the enhanced dedicated channel (E-DCH) including, for example, the E-DCH relative grant channel (E-RGCH), E-DCH hybrid automatic repeat request (HARQ) acknowledgement indicator channel (E-HICH), and E-DCH absolute grant channel (E-AGCH), but keeps the F-DPCH (or DPCH) allocation and related offsets as well as their various radio network temporary identifiers (RNTIs), uplink scrambling codes and other resources and configurations. In DL control channels release, a WTRU in No-TX mode releases all of the downlink control channel resources, including channelization codes, signatures, and frame offset, but keeps the various RNTIs, uplink scrambling codes and other resources and configurations.

A specific No-TX mode resource persistence option may be signaled to the WTRU from higher layers with the possible associated parameters of operations. Alternatively, the WTRU may be configured to use a specific resource persistence option and the parameters associated to that option are signaled from higher layers or pre-defined.

In an alternative embodiment, the resource persistence option may change in time so that more information is released after longer periods of inactivity. By way of example, the following resource persistence option pattern may be configured or signaled. When initiating No-TX mode, the full persistence option is enabled. After a specific time period of inactivity (that may be pre-defined or signaled), for example in terms of a number of TTIs, frames or another duration measurement, the persistence option changes automatically to downlink (DL) E-DCH control channels release. Then, after another specific time period of inactivity, the persistence option changes automatically to DL control channels release. Other resource persistence patterns may also be defined, as desired.

Enabling No-TX Mode

A set of triggers and methods may activate a No-TX mode. To enable at least one No-TX mode with at least one WTRU, there exist several possible methods.

In one embodiment, a No-TX mode is enabled upon configuration of the radio link. The No-TX mode may be activated immediately upon configuration or after a time-delay that is either signaled or pre-configured.

In another embodiment, a No-TX mode is enabled through higher layer signaling, preferably with layer 3 acknowledgment (ACK). The start time of at least one No-TX mode is signaled by higher layers, such as the radio resource control (RRC), as part of the message. Alternatively, the No-TX modes start time is implicitly determined by the arrival time of the higher layer message, or the transmission time of the uplink (UL) acknowledgement (ACK).

In another embodiment, a No-TX mode is enabled after a specified period of inactivity, where the actual value for the time period of inactivity used as triggering criteria can be signaled by higher layers or pre-defined. In one embodiment, a phased approach may be defined. For example, consider X, Y and Z to be numbers greater than 0. An inactivity period of duration X triggers the CPC DTX operation while a more prolonged inactivity period of X+Y triggers the No-TX mode. If the WTRU is in a CELL_DCH state, a third phase may be included where an even more prolonged period of X+Y+Z triggers the WTRU to transition to CELL_FACH state.

In another embodiment, a No-TX mode is enabled when the WTRU sends a request to the radio access network (RAN), or Node B, to start a No-TX operation. An application on the WTRU, being in a privileged position to monitor the battery levels and the traffic usage, may trigger the transmission of a message requesting the RAN for No-TX mode to be started. Such a request may include No-TX mode parameters such as the start time and proposed transmission opportunity patterns and/or cycles for the No-TX mode. In the preferred embodiment, the request to the RAN and potential response from the RAN are preferably signaled by higher layers.

In another embodiment, a No-TX mode is enabled using a high speed shared control channel (HS-SCCH) order, preferably with layer 1 ACK. The currently reserved bit in the HS-SCCH order type field may be used to indicate the new type of order. This approach would leave 2 bits in the order type field to indicate enabling or disabling of the No-TX mode, and can carry additional information. Alternatively, a new HS-SCCH format can be defined for enabling No-TX mode. Further, in an alternate embodiment, new combinations of the channelization code set bits, modulation bit and/or transport block size can be specified for the new HS-SCCH order. This approach has the advantage that more bits are available which can be used to carry additional information. Then, the start time and possibly other parameters related to the No-TX mode can be implicitly determined by the relative timing of the HS-SCCH order or from the time of ACK.

Disabling No-TX Mode

A set of triggers and methods can deactivate the No-TX mode of operation in order to resume DPCCH transmissions. Upon disabling the No-TX mode, the WTRU returns to regular CELL_FACH state (or, alternatively, CELL-DCH state) and may be configured to include DRX and/or DTX periods. This behavior may be either signaled by higher layers, such as at configuration, or pre-configured.

In a timer-based method, both the WTRU and the Node B know the instant of time No-TX mode is disabled. This time instant can be specified by a time-delay relative to the enabling of the No-TX mode, or alternatively it can be specified as an absolute time in terms of frame and subframe number. The time instant can be signaled by higher layers during configuration or the enabling of the No-TX mode, or pre-configured. The resources required to re-establish the radio link can also be configured by higher layers during configuration or the enabling of the No-TX mode, or pre-configured. Upon disabling of the No-TX mode, the Node B and WTRU can re-establish the radio link. Techniques for re-establishing the radio link from No-TX mode are discussed in detail below.

In a network initiated method, the network initiates the disabling of the No-TX mode. In a first embodiment, the Node B polls the WTRU during specific network transmission opportunities or, equivalently, WTRU listening periods. The polling message from the Node B may contain resource allocation information to avoid the need for RRC or other types of higher layer messaging for resource allocation. This feature is particularly useful since only a few parameters need to be configured. The allocation may be signaled implicitly or explicitly or in combination. The actual information contained in the message depends on the resource persistence option.

In the case of the full persistence option, no resource allocation is necessary. For the DL E-DCH control channels release option, the E-HICH channelization code, E-HICH and E-RGCH signatures and E-AGCH channelization code and possibly others are signaled. In addition to those resources, the F-DPCH or DPCH channelization code and offset, and possibly other information, also need to be allocated and signaled in the case of DL control channels release option.

The polling may be carried out using various approaches, including a HSDPA-like approach, a HS-SCCH-less like approach, a HS-SCCH order approach, a new channel approach, and a paging approach.

In the HSDPA-like approach, the WTRU already has a high-speed downlink shared channel (HS-DSCH) Radio Network Transaction Identifier (H-RNTI) and a list of codes to listen to for the HS-SCCH. As part of the No-TX mode RRC configuration, the list of HS-SCCH codes to listen to may be reduced for WTRUs in No-TX mode. Then, the HS-SCCH and HS-DPCH may be used to transmit control data to the WTRU. Since there is no active close-loop power control in No-TX mode, to keep the transmission power at a reasonable level the data portion of the transmission signal should use strong coding and/or be transmitted with higher power. The configurable number of HARQ retransmissions may also be used to add robustness.

In the HS-SCCH-less like approach, the same approach as the HSDPA-like approach is used but no HS-SCCH transmission is performed. To reduce the decoding complexity at the WTRU, a smaller number of channelization codes for listening and a limited number of transport formats may be configured or signaled to the WTRU. The HS-DPCH contains the resource allocation, which may be used when the WTRU has data to transmit.

In the HS-SCCH order approach, a HS-SCCH order may also be used to signal polling to the WTRU by using the existing reserved bit to create a new order type. Alternatively, new combinations of the channelization code set bits and modulation bit and/or transport block size can be specified for the new HS-SCCH order. This approach has the advantage that more bits are available which can be used to carry additional information, such as channelization code allocation information.

In the new channel approach, a new channel can be defined for the polling mechanism that may include some or all channel allocation required. For example, this channel can indicate a set of resources to be used out of a collection of possible sets that has been previously broadcast or sent to the WTRU at association.

In the paging approach, a paging channel can additionally be used for polling. After the polling message has been sent, the Node B listens for the WTRU answer for a given period of time, which can be signaled by higher layers or pre-configured.

In response to a polling message, the WTRU transmits an acknowledgment if the WTRU has data in it's transmit buffer. The acknowledgement message may take one of the following forms. In a first form, the acknowledgment (ACK) message is in the form of a transmission of one or several UL DPCCH slots preferably using a ramp-up procedure. This ramp-up procedure is described in further detail below. In another form, the ACK message is transmitted on the high-speed DPCCH (HS-DPCCH). In addition to the UL DPCCH, the WTRU may also transmit the HS-DPCCH acknowledgment to the Node B. The associated DPCCH transmission power can be set using a ramp-up procedure, or by using an open-loop control mechanism with additional power headroom, as signaled by higher layers or pre-configured. The HS-DPCCH power offset with respect to the DPCCH may be signaled by higher layers or pre-configured. In addition, a channel quality indication (CQI) report and/or a scheduling request can be sent at the same time, providing additional information to the Node B. In another form, a new channel, which combines elements of the UL DPCCH and the HS-DPCCH, may be used to transmit an acknowledgement if the WTRU has data in the transmit buffer of the WTRU. This new channel may use the procedure and concepts described below, and may contain additional information about the WTRU transmit buffer. For example, the new channel may contain scheduling information, CQI, and other information.

Based on the ACK received from the WTRU, the Node B is aware that the WTRU has data to transmit and begins a link re-establishment procedure, as described below.

When the WTRU has no data to transmit, provided WTRU transmission opportunities exist, the WTRU may not answer the Node B poll. Alternatively, when the WTRU has no data to transmit, the WTRU may inform the Node B that there is no data in the WTRU transmit buffer via a negative acknowledgement (NACK). The WTRU may optionally provide measurements to the network, and/or signal to the network that the WTRU is active and present. It may be advantageous for the WTRU to respond to the Node B in the same way the WTRU communicates with the Node B described above. When there are no defined WTRU transmission opportunities, the WTRU answers the Node B poll using the mechanism described above.

If the Node B has data to transmit to a WTRU in No-TX mode, the Node B may use one of the network transmission opportunity defined for that WTRU. The Node B sends an initial message to the WTRU during a network transmission opportunity. For example, the Node B may use one of the signaling methods described above. In particular, the initial Node B transmission may or may not contain data and may contain channel configuration information for the WTRU. Then, the WTRU acknowledges the Node B by using one of the methods described above. Lastly, after the Node B has received the acknowledge message, a radio-link initialization procedure is started and data transfer may begin.

Alternatively, during network transmission opportunities, the WTRU and the Node B may re-establish the radio link. This can be achieved if the F-DPCH is allocated, as is the case when using the full persistence option, and by following the radio link re-establishment procedure described below. However, the disadvantage of this method is that the radio-link is re-established at every network transmission opportunity, thereby wasting radio resources and battery power.

In another embodiment, the WTRU initiates the disablement of No-TX mode. If the WTRU has data to transmit, the WTRU waits for the next available WTRU transmission opportunity. To inform the Node B of the state of the WTRU transmit buffer, the WTRU may send a request to the Node B by using different mechanisms described below. After successfully sending the request, the Node B is aware that the WTRU has data to transmit and starts a link re-establishment procedure. If the WTRU fails to seize the transmission opportunity, such as when the WTRU does not receive a Node B answer or acknowledgment for a given time period, then the WTRU must wait for the next transmission opportunity to retry. Alternatively, after a given number of failed attempts, the WTRU may use the RACH to contact the Node B using standard techniques. The network determines if the WTRU keeps its radio resources or may reconfigure the WTRU for new radio resources. Alternatively, if the WTRU is in a CELL_DCH state, the WTRU may autonomously revert to the CELL_FACH state and use the existing mechanism to request resources for data transmission.

WTRU Transmissions in No-TX Mode

Although the No-TX mode of operation is characterized by a suspension of transmissions by the WTRU, there are occasions where a WTRU may need to send transmissions to the Node B while in No-TX mode of operation. These occasions may occur in, although not limited to, any of the following example situations. For example, there may be the need for the WTRU to leave the No-TX mode of operation and resume radio link synchronization (link re-establishment) with the Node B. There may be the need to transmit notifications, such as WTRU alive notifications, to the Node B to indicate that the WTRU should still be considered as being active. This may imply that the WTRU should be kept in its current state, whether it be CELL_DCH state or CELL_FACH state. There may be the need to transmit measurements to the Node B, either scheduled or triggered, by an unpredictable mechanism such as a large variation of the measured common pilot channel (CPICH) power. There may be the need to transmit an acknowledgment or answer to the Node B polling.

Four scenarios for WTRU transmissions while in No-TX mode are provided: (1) a ramp-up procedure allowing the WTRU to set its power in order to limit undue noise rise increase at the Node B; (2) WTRU alive notifications allowing a WTRU in No-TX mode to notify the Node B that the WTRU should still be considered as active; (3) channel acquisition transmissions to resume radio link synchronization; and (4) transmit power control commands carried through high-speed shared control channel (HS-SCCH).

Figure 2:
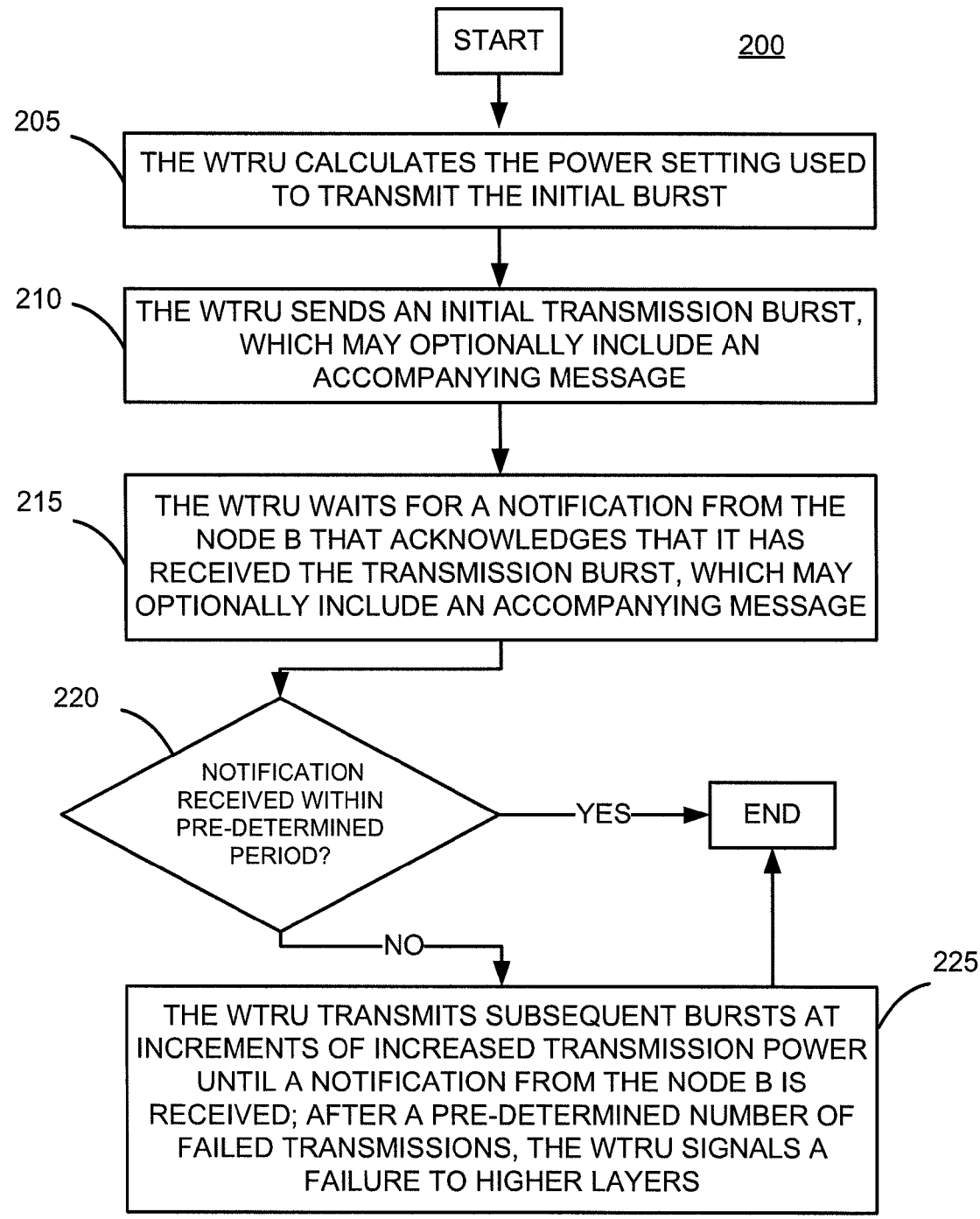
FIG. 2 is a flow diagram for a ramp-up procedure for WTRU transmissions in No-TX Mode.

FIG. 2 is a flow diagram for a ramp-up procedure 200 for WTRU transmissions in No-TX Mode. The No-TX mode permits a WTRU to stay in CELL_FACH state (or, alternatively CELL_DCH state) without any power control loop for an extended period of time. In this period of time, the path loss between the WTRU and the Node B may have varied greatly which prevents a WTRU from simply resuming its transmissions using the last power setting it was using at the time it started the No-TX mode of operation. In order to limit undue noise rise increase at the Node B from WTRU transmissions operating in No-TX mode, the WTRU uses the power-ramping procedure 200 of FIG. 2.

In step 205, the WTRU calculates the power setting used to transmit the initial burst. The power setting calculation may be based on one or more of the following criteria: a pre-configured or signaled equation allowing the WTRU to derive a power setting from the above-described elements; a power measurement from the CPICH; information signaled by the Node B or pre-configured, including transmission power on the CPICH or different power settings and offsets on various downlink channels, whereby the WTRU estimates the CPICH power and the path loss between the Node B and the WTRU; and a margin, either signaled or pre-configured, that may be dependent on the noise rise measured by the Node B and is used by the WTRU to calculate the transmission power that should be used.

In step 210, the WTRU sends an initial transmission burst, which may optionally include an accompanying message. The initial burst can consist of DPCCH transmission or a pre-defined or reserved sequence dedicated to WTRU transmissions in No-TX mode. The accompanying message can include, but is not limited to: a radio resource request, for example a F-DPCH request; a message indicating that the WTRU is still active, referred to as a WTRU alive notification; information about traffic buffered at the WTRU, such as a scheduling information (SI) or any other measurement taken by the WTRU; and small amounts of user data traffic.

In step 215, the WTRU waits for a notification from the Node B that acknowledges that it has received the transmission burst, which may optionally include an accompanying message. This notification from the Node B can be transmitted though the acquisition indicator channel (AICH), the E-HICH, the E-AGCH (with or without the associated grant), the HS-SCCH, the DPCH or F-DPCH or a new channel dedicated for the notification. The accompanying message can include, but is not limited to, a control message allocating radio resources and configuring parameters including channelization codes, time offsets, signatures for control channels, or scheduling grants such E-AGCH.

In step 220, the WTRU determines if it has received the notification within pre-determined period of time. If the WTRU receives notification within the pre-determined period of time, the ramp-up procedure 200 ends. If the WTRU does not receive the notification within the pre-defined period of time, the WTRU in step 225 transmits subsequent bursts at increments of increased transmission power until a notification from the Node B is received; after a pre-determined number of failed transmission, the WTRU signals a failure to higher layers and the ramp-up procedure 200 ends. In case of failure, and depending on the importance of the transmission, the WTRU may optionally revert to existing methods such as using the RACH for acquiring a channel to communicate with the Node B.

By definition, the No-TX mode suspends any signal from being transmitted from the WTRU to the Node B so the Node B can no longer rely on the power control loop to monitor which users need to be kept in CELL_DCH state, or and which users in CELL_DCH state need to be pushed to CELL_FACH or simply be disconnected. As mentioned above, one motivation for a WTRU to transmit signals to the Node B while in No-TX mode is for the Node B to be able to keep track of which WTRUs in No-TX mode should still be considered as active, for which the Node B would continue to reserve some resources such as codes and/or memory, and which WTRUs need to be disconnected. Accordingly, the transmission burst and procedure described above with respect to FIG. 2 may be used by the WTRU to notify that it should still be considered as an active user. The WTRU alive notification may be sent periodically, the period can be pre-configured or signaled by the Node B, or it can be sent after being polled by the Node B.

One of the benefits of the No-TX mode is for the Node B to be able to release and reuse some of the resources used by a WTRU that has nothing to transmit at a given instant. To that effect, different options in terms of persistence of the radio resource allocation have been described above. In order to leave the No-TX mode of operation, resume transmitting data again and resume radio link synchronization with the Node B, the WTRU needs to get the radio resources that it had released when it entered the No-TX mode of operation. This may be performed by transmitting a channel acquisition request to the Node B. The method and structure underlying the channel acquisition request can be based on the procedure defined above.

The radio resources or configuration parameters that the channel acquisition request may include: F-DPCH resources, for example frame offset and channelization codes; E-AGCH resources, for example channelization codes; E-HICH and/or E-RGCH resources, for example channelization codes and signatures; and HS-SCCH resources, for example channelization codes. Alternatively, the resources can be allocated based on implicit rules as described below so that radio bandwidth may be saved.

While in the No-TX mode the WTRU may be assigned an H-RNTI identifier to allow the serving cell to transmit power control commands to the WTRU in the absence of an allocated F-DPCH. The assigned H-RNTI may be the same as the one used in the normal CELL_FACH state, or alternatively normal CELL_DCH state. In one embodiment, the H-RNTI used is different from the one used in normal mode. This H-RNTI is called the secondary H-RNTI. The secondary H-RNTI may be shared and used to identify a single WTRU or many WTRUs. Transmit power control commands may be sent at any of time at the discretion of the network and are carried using a special format, type "P", for the HS-SCCH. Such a format allows multiplexing of several commands destined to different WTRUs that share the same secondary H-RNTI. In this case, the WTRU knows how to de-multiplex the bits carrying its TPC commands from bits carrying commands from other WTRUs using rules and pre-signaled allocations, such as a time slot. The HS-SCCH type P may also be used to control the maximum data rate of WTRUs instead of, or in addition to, the transmission power of the WTRUs. This would allow rate control in the absence of an allocated E-RGCH.

Radio Link Re-Establishment

In the scenarios described above, the WTRU and Node B must re-establish a radio link when resuming operation from the No-TX mode. The radio-link may be considered re-established when the quality of the F-DPCH on the downlink is acceptable and the transmission power levels are stabilized by power control. To complete radio-link establishment, the F-DPCH code and offset must be known by the WTRU and Node B.

In case the full persistence or DL E-DCH control channels release persistence options are used, or if the network has signaled the F-DPCH parameters explicitly or implicitly to the WTRU as part of the polling message or the request answer, the WTRU knows which F-DPCH channelization code and offset to use.

In the case of polling, the WTRU may start listening to the F-DPCH after a given time period after transmitting its response message. In the case of WTRU transmission opportunities, the WTRU may start listening to the F-DPCH after a given time period after transmitting the request or after the optional Node B answer, which may also contain a channel assignment. These time periods can be signaled by higher layers or configured.

In case the network makes extensive use of WTRU initiated transmission, a set of F-DPCH channelization codes and offsets can be shared among several WTRUs with different WTRU transmission opportunities to avoid possible collisions. This set may be signaled by higher layers or pre-configured. Optionally, the choice of which F-DPCH channelization code and offset used within the allowed set can be random or chosen according to pre-defined rules.

Alternatively, WTRUs sharing the set of F-DPCH channelization codes and offsets may have overlapping transmission opportunities. The WTRUs may select the radio resources randomly or according to rules set so that there is little probability of collision, such as using information like the H-RNTI and enhanced RNTI (E-RNTI). When there is a radio-link re-establishment failure, the WTRU may try again at the next WTRU transmission opportunity. When a number, signaled or pre-configured, of failed attempts has been reached, the WTRU reverts to CELL_FACH or other pre-defined mechanism to contact the network.

The radio link re-establishment procedure may also depend on the time delay from the last WTRU transmission. When the delay from the last WTRU transmission is less than a given time period, referred to as T_LAST_UE_TX, which may be indicated by higher layers or configured, the radio-link should be considered "in-sync" and the existing procedure specified in CPC should be used to re-start transmission. T_LAST_UE_TX should be designed so that the probability of recovering the radio-link using the CPC procedure is large so that there is minimal impact on power control. Typically, the value for T_LAST_UE_TX can be chosen to be less than or equal to the largest DTX time value allowed for CPC. Additional preamble slots may also be used to estimate the new power level required to establish the radio link and to initialize power control loop on both uplink and downlink. When the delay from the last WTRU transmission is greater than T_LAST_UE_TX, the radio link should be considered broken and the existing radio link synchronization initialization procedure should be used.

In No-TX mode, as a result of measurements not being available for a very long period of time, existing radio link failure definitions may not apply or apply only for a limited time after entering No-TX mode. After a defined link failure period of time has elapsed, the radio link should be considered lost and the radio-link initialization procedure should be used.

Implicit Resource Allocation

As indicated above, the F-DPCH channelization code and offset must be known by the WTRU to re-establish radio synchronization. In the DL control channels release persistence option, this information is not available to the WTRU. The WTRU may be provided with this information from the network via explicit signaling using one of the approaches described above. Alternatively, the resource can be allocated explicitly. According to one embodiment, a mechanism for implicit F-DPCH code and offset allocation for the WTRU is described.

Figure 3:
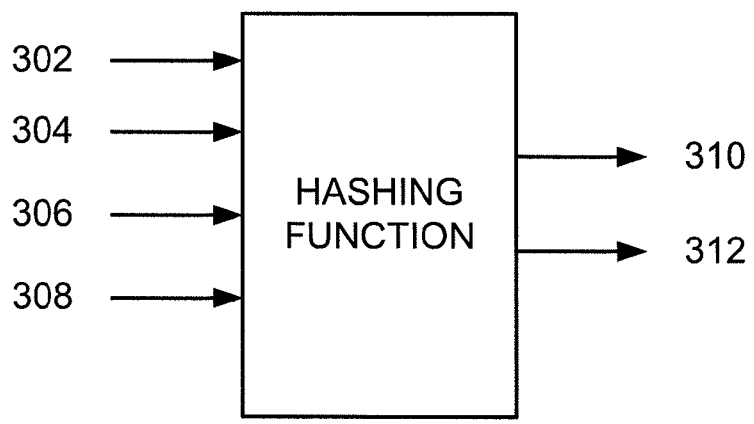
FIG. 3 shows a hashing function diagram using shared information to determine a downlink dedicated physical channel code and offset index within the code.

The WTRU and the network share information that can be used to determine the F-DPCH code and offset allocation. First, a set of F-DPCH channelization codes and offsets are known by the network and WTRU as being available for selection. Typically, the network reserves a set of channelization codes and signals this information to the WTRU. The set of selectable channelization code can be optionally paired with specific offsets, or alternatively the set of selectable channelization codes and the set of offsets can be treated separately. Then, the network and WTRU determine the F-DPCH code and offset index within the at least one set specified above based on a hashing function applied to a subset of the WTRU-specific information shared simultaneously by both the network and the WTRU. FIG. 3 shows a hashing function diagram illustrating the shared information. The shared information provided to the hashing function may include a E-RNTI 302, a H-RNTI 304, a WTRU scrambling code index 306, and a timing of the WTRU's response 308, in number of slots or TTIs, relative to the start of the listening period in the polling case or a timing of the Node B's response 308, in number of slots or TTIs, with respect to the transmission opportunity window in the transmission opportunity case. The hashing function outputs the F-DPCH code 310 and the F-DPCH code offset index 312. The hashing function should be designed to minimize the probability that two or more WTRUs are assigned the same resource.

Temporary Resource Allocation

Several WTRUs in No-TX mode may have different WTRU listening periods and thus can share a temporary code resource, such as a F-DPCH code and code offset. The temporary code resources can be signaled by higher layers during configuration of the No-TX mode. Provided that no WTRUs are allocated the same code and listening period or pattern, there will be no collision, as further described below. Once the radio synchronization is re-established, the network can assign a new permanent code allocation, possibly using a fast partial link reconfiguration message. Alternatively, HS-SCCH-like orders can be used to transmit power control commands temporarily before the F-DPCH channelization code and offset are allocated.

Fast Partial Link Reconfiguration Message

A fast partial link reconfiguration message may be provided to the WTRU. According to one embodiment, fast partial link reconfiguration messages are provided when a radio link is being re-established after an extended period of no transmission, and some or all of the downlink control resources need to be allocated. Fast partial link reconfiguration messages may also be used where the resources were temporarily allocated to the WTRU and need to be re-allocated.

The fast partial link reconfiguration message may contain one or more of the following configuration information: a F-DPCH channelization code; a F-DPCH frame offset; a E-HICH and E-RGCH channelization code; a E-HICH signature; a E-RGCH signature; HS-SCCH channelization codes; and various radio network temporary identities such as the E-RNTI, H-RNTI and others. When the partial link reconfiguration message contains small amount of data information, layer 1 (L1) messaging may be used. For example, a new HS-SCCH order with possibly additional payload on the HS-DPCH containing the new allocation may be used. Alternatively, a new RRC message containing the some or all of the information listed above may be used.

The techniques herein specify mechanisms to improve the number of intermittently transmitting users that may be supported by a Third Generation Partnership (3GPP) High Speed Downlink Packet Access (HSDPA) Release 7, and beyond, network. These methods and embodiments may also be applied to other wireless communication systems. The disclosed techniques permit the WTRU and Node B to increase the efficiency of the radio link by removing the dependence on the DPCCH continuous transmission. Advantages of the proposed techniques include: reducing radio overhead in long period of inactivity; increasing system capacity by reducing interference from the control channels and higher code availability on the DL; and improving battery performance in the WTRU by more efficiently using scarce battery resources.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU) in an idle mode for transmitting over an enhanced dedicated channel (E-DCH), the method comprising:
    determining a power transmission level for a transmission burst;
    transmitting the transmission burst at the determined power transmission level;
    receiving an acquisition indication and a resource assignment from a Node B in response to the transmission burst, wherein the resource assignment includes an assigned E-DCH resource;
    transmitting data using the assigned E-DCH resource; and
    releasing the assigned E-DCH resource on a condition that the WTRU receives a release command from the Node B on an E-DCH Absolute Grant Channel (E-AGCH).

2. The method of claim 1, further comprising:
    receiving, from the Node B, the E-DCH Absolute Grant Channel (E-AGCH) with an enhanced Radio Network Temporary Identifier (E-RNTI) that identifies the WTRU.

3. The method of claim 1, further comprising:
    releasing the assigned E-DCH resource on a condition that the WTRU has no data to send.

4. The method of claim 1, further comprising:
    releasing the assigned E-DCH resource on a condition that a predetermined period of time has elapsed since receiving the assigned E-DCH resource.

5. The method of claim 1, further comprising:
    re-transmitting the transmission burst at a new power transmission level on a condition that the acquisition indication is not received within a predetermined period of time.

6. A wireless transmit/receive unit (WTRU) in an idle mode configured to transmit over an enhanced dedicated channel (E-DCH), the WTRU comprising:

a processor configured to determine a power transmission level for a transmission burst;

a transmitter configured to transmit the transmission burst at the determined power transmission level;

a receiver configured to receive an acquisition indication and a resource assignment from a Node B in response to the transmission burst, wherein the resource assignment includes an assigned E-DCH resource;

the transmitter configured to transmit data using the assigned E-DCH resource; and the processor, the transmitter, and the receiver configured to release the assigned E-DCH resource on a condition that the WTRU receives a release command from the Node B on an E-DCH Absolute Grant Channel (E-AGCH).

7. The WTRU of claim 6, wherein the receiver is further configured to receive, from the Node B, the E-DCH Absolute Grant Channel (E-AGCH) with an enhanced Radio Network Temporary Identifier (E-RNTI) that identifies the WTRU.

8. The WTRU of claim 6, wherein the processor, the transmitter, and the receiver are further configured to release the assigned E-DCH resource on a condition that the WTRU has no data to send.

9. The WTRU of claim 6, wherein the processor, the transmitter, and the receiver are further configured to release the assigned E-DCH resource on a condition that a predetermined period of time has elapsed since receiving the assigned E-DCH resource.

10. The WTRU of claim 6, wherein the transmitter is further configured to re-transmit the transmission burst at a new power transmission level on a condition that the acquisition indication is not received within a predetermined period of time.

* * * * *